Patented Aug. 30, 1932

1,874,099

UNITED STATES PATENT OFFICE

ROBERT HALLER, OF RIEHEN, NEAR BASEL, SWITZERLAND, ASSIGNOR TO FIRM OF SOCIETY OF CHEMICAL INDUSTRY IN BASLE, OF BASEL, SWITZERLAND

MANUFACTURE OF DYEINGS ON TEXTILES

No Drawing. Application filed August 17, 1931, Serial No. 557,725, and in Switzerland September 3, 1930.

It has been shown in application Serial No. 389,324, filed Aug. 29, 1929, that valuable dyeings can be produced on the fibre by treating with a diazo compound the leuco compound of a dyestuff which can be vatted.

By this invention dyeings of especial value are obtained by treating on the fibre with a diazo compound the leuco compound of a vat dyestuff which is derived from a carbazole-indophenol.

The following example illustrates the invention:—

6 grams of a dyestuff obtained by sulfurizing the condensation product from p-nitrosophenol and carbazole with highly sulfurated sodium sulfide (cf. U. S. Patent No. 956,348) are carefully stirred with 1 cc. of Turkey red oil, 18 cc. of caustic soda solution of 36° Bé., 15 grams of sodium hydrosulphite and 200 cc. of water at 80° C. until the dyestuff has become vatted; the whole is then made up to 1 litre by the addition of warm water. 100 grams of cotton are introduced into the dye-bath so prepared, moved therein for ½ hour, then wrung out, rinsed with acidified water and developed in a diazo bath which has been neutralized with sodium acetate and contains per litre the diazo compound from 10 grams of 5-nitro-2-anisidine. The cotton is thus dyed a deep black shade which is fast to washing, chlorine and light.

Similar shades are obtained if there are used other diazo compounds, for example, the diazo compound of 2:5-dichloraniline, meta-nitro-paratoluidine, aminoazo-toluene, 4'-chloro-4-amino-2-methyl-5-methoxy-1:1'-azobenzene, aniline-azo-α-naphthylamine, 4-chloro-ortho-toluidine, 4-chloro-ortho-nitraniline, or a tetrazo compound, such as the tetrazo compound of 4:4'-diamino-2-methyl-5-methoxy-1:1'-azobenzene.

Instead of the dyestuff used in the above example there may also be used for instance the dyestuff obtained by sulfurizing the indophenol from p-nitrophenol and N-ethylcarbazole with alkaline polysulfides (cf. Example 2 of U. S. Patent No. 956,092). There may further be used the dyestuffs obtained from carbazole indophenols by sulfurizing in the presence of benzidine, or of benzidine and a fluxing agent, such as for example phenol (cf. U. S. Patent 1,565,736), or the dyestuffs which are formed by reducing the indophenols from nitrosophenols and carbazole, and sulfurizing the leuco derivatives in the presence of aromatic amino compounds corresponding to hydrocarbons having less than 12 carbon atoms, at substantially 180° (cf. U. S. Patent 1,695,756), and finally also the dyestuffs obtained from the leuco derivatives of carbazole indophenols by heating with sulfur in the presence of aliphatic compounds containing nitrogen in the proportion of at least one nitrogen atom for two carbon atoms (cf. U. S. Patent 1,662,415).

What I claim is:—

1. A manufacture of new dyeings on textiles, consisting in coupling leuco compounds of vat dyestuffs deriving from carbazole-indophenols with diazo compounds, the coupling being effected on the fibre.

2. A manufacture of new dyeings on textiles, consisting in coupling leuco compounds of vat dyestuffs deriving from carbazole-indophenols with diazo compounds obtained by diazotizing amino-azo-dyestuffs, the coupling being effected on the fibre.

3. A manufacture of new dyeings on textiles, consisting in coupling leuco compounds of vat dyestuffs deriving from carbazole-indophenols with diazotized amino-azo-toluene, the coupling being effected on the fibre.

4. A manufacture of new dyeings on textiles, consisting in coupling leuco compounds of vat dyestuffs deriving from carbazole-indophenols with diazotized aniline-azo-α-naphthylamine, the coupling being effected on the fibre.

In witness whereof I have hereunto signed my name this 7th day of August, 1931.

ROBERT HALLER.